(12) United States Patent
Kuroda et al.

(10) Patent No.: US 6,795,294 B2
(45) Date of Patent: Sep. 21, 2004

(54) LAMINATED CAPACITOR, PRINTED CIRCUIT BOARD, DECOUPLING CIRCUIT, AND HIGH-FREQUENCY CIRCUIT

(75) Inventors: Yoichi Kuroda, Fukui (JP); Yoshio Kawaguchi, Fukui (JP); Masaaki Taniguchi, Fukui-ken (JP); Kenichi Mizuno, Fukui (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 10/706,137

(22) Filed: Nov. 13, 2003

(65) Prior Publication Data
US 2004/0150941 A1 Aug. 5, 2004

(30) Foreign Application Priority Data
Jan. 31, 2003 (JP) ........................ 2003-024466

(51) Int. Cl.[7] .............................................. H01G 4/228
(52) U.S. Cl. ................... 361/306.1; 361/306.3; 361/321.1; 361/321.5; 361/311; 361/313
(58) Field of Search ...................... 361/306.1, 306.3, 361/302, 303, 305, 321.1, 321.5, 307, 308.1, 311, 313, 328, 324, 330

(56) References Cited

U.S. PATENT DOCUMENTS

| | | | | |
|---|---|---|---|---|
| 5,822,174 A | * | 10/1998 | Yamate et al. | ............... 361/302 |
| 6,061,227 A | * | 5/2000 | Nogi | ........................ 361/303 |
| 6,191,932 B1 | * | 2/2001 | Kuroda et al. | ............. 361/303 |

FOREIGN PATENT DOCUMENTS

| | | |
|---|---|---|
| JP | 2991175 | 10/1999 |
| JP | 2000-323354 | 11/2000 |

* cited by examiner

*Primary Examiner*—Dean A. Reichard
*Assistant Examiner*—Nguyen T. Ha
(74) *Attorney, Agent, or Firm*—Keating & Bennett, LLP

(57) ABSTRACT

A laminated capacitor has an end surface pitch Pe, which defines an interval between adjacent first and second external terminal electrodes disposed on end surfaces having shorter sides in a body of a laminated capacitor, which is equal to or less than about 0.9 times of a side-surface pitch Ps, which defines an interval between adjacent first and second external terminal electrodes disposed on side surfaces having longer sides, in order to enhance the effect of magnetic-flux cancellation at the end surfaces and to reduce the equivalent series inductance of the whole laminated capacitor.

18 Claims, 13 Drawing Sheets

(1)

(2)

LAMINATED CAPACITOR, PRINTED CIRCUIT BOARD, DECOUPLING CIRCUIT, AND HIGH-FREQUENCY CIRCUIT

BACKGROUND OF THE INVENTION

1. Field of the Invention

The present invention relates to laminated capacitors, printed circuit boards, decoupling circuits, and high-frequency circuits, and more particularly, to laminated capacitors advantageously applicable to high-frequency circuits, and to printed circuit boards, decoupling circuits, and high-frequency circuits all including the laminated capacitors.

2. Description of the Related Art

A conventional laminated capacitor related to the present invention is, for example, described in Japanese Unexamined Patent Application Publication No. 11-144996 (patent reference 1). FIG. 7 is a plan view showing the appearance of a laminated capacitor 1 described in patent reference 1.

The laminated capacitor 1 is provided with a rectangular parallelepiped capacitor body 2. The capacitor body 2 has two rectangular main surfaces 3 and 4 opposing each other, and two side surfaces 5 and 6 opposing each other and extending in a longer-side direction of the main surfaces 3 and 4, and two end surfaces 7 and 8 opposing each other and extending in a shorter-side direction of the main surfaces 3 and 4, the side surfaces and the end surfaces connected to the main surfaces 3 and 4.

The capacitor body 2 is provided with a plurality of dielectric layers 9 extending in the direction of the main surfaces 3 and 4, and is also provided inside thereof with at least a pair of the first and the second internal electrodes, not shown in the figure, facing each other across a specific dielectric layer 9 in order to define a capacitor unit. The first and the second internal electrodes respectively have the first and the second lead electrodes extending onto the side surfaces 5 and 6 and the end surfaces 7 and 8 of the capacitor body 2.

On the side surfaces 5 and 6 and the end surfaces 7 and 8 of the capacitor body 2, the first external terminal electrodes 10 electrically connected to the first internal electrode through the first lead electrodes, and the second external terminal electrodes 11 electrically connected to the second internal electrode through the second lead electrodes are provided. To distinguish more easily the first external terminal electrodes 10 from the second external terminal electrodes 11, the first external terminal electrodes 10 are shown in white, and the second external terminal electrodes 11 are shown in black in the figure.

Two first external terminal electrodes 10 are provided on each of the side surfaces 5 and 6, and one first external terminal electrode 10 is provided on each of the end surfaces 7 and 8. Two second external terminal electrodes 11 are disposed on each of the side surfaces 5 and 6 so as to be disposed alternately with the first external terminal electrodes 10, and one second external terminal electrode 11 is disposed on each of the end surfaces 7 and 8 so as to be disposed alternately with the first external terminal electrode 10.

In the laminated capacitor 1 shown in FIG. 7, since the first external terminal electrodes 10 and the second external terminal electrodes 11 are adjacent to each other over the side surfaces 5 and 6 and the end surfaces 7 and 8, all the first external terminal electrodes 10 and all the second external terminal electrodes 11 are disposed alternately through the two side surfaces 5 and 6 and the two end surfaces 7 and 8.

FIG. 7 also shows typical paths and directions of current flowing through the laminated capacitor 1 by arrows. As indicated by the arrows, the current flows from the first external terminal electrodes 10 to the second external terminal electrodes 11 at the state or the point of time of the figure.

When the current flows in that way, magnetic flux having a direction determined by the direction of the current is generally induced, and therefore, a self-inductance is generated. In this case, in close vicinity of external terminal electrodes 10 and 11, the current flows away from the first external terminal electrodes 10 toward the second external terminal electrodes 11. So the directions of the current are opposite between adjacent external terminal electrodes 10 and 11, and therefore the magnetic flux is effectively canceled. As a result, the equivalent series inductance (ESL) of the laminated capacitor 1 is reduced, and therefore, the laminated capacitor 1 can be advantageously applied to high-frequency circuits.

As shown in FIG. 7, an end surface pitch Pe which defines the interval between adjacent first and second external terminal electrodes 10 and 11 disposed on the end surfaces 7 and 8 is made equal to a side surface pitch Ps defining the interval between adjacent first and second external terminal electrodes 10 and 11 disposed on the side surfaces 5 and 6 in the conventional laminated capacitor 1.

The effect of magnetic-flux cancellation, described above, between adjacent first and second external terminal electrodes 10 and 11 depends on the magnitudes of the pitches Pe and Ps. The smaller the pitches Pe and Ps are, the larger the effect of magnetic-flux cancellation is. Therefore, when the end surface pitch Pe is equal to the side surface pitch Ps as in the laminated capacitor 1 shown in FIG. 7, the effect of magnetic-flux cancellation between adjacent first and second external terminal electrodes 10 and 11 disposed on the end surfaces 7 and 8 is substantially equal to the effect of magnetic-flux cancellation between adjacent first and second external terminal electrodes 10 and 11 disposed on the side surfaces 5 and 6.

Under this condition, since the number of the first and the second external terminal electrodes 10 and 11 disposed on the end surfaces 7 and 8 is smaller than the number of the first and the second external terminal electrodes 10 and 11 disposed on the side surfaces 5 and 6 in the laminated capacitor 1 shown in FIG. 7, the effect of magnetic-flux cancellation works at fewer locations on the end surfaces 7 and 8. The effect of magnetic-flux cancellation on the end surfaces 7 and 8 is consequently expected to be inferior to that on the side surfaces 5 and 6. Therefore, if the effect of magnetic-flux cancellation on the end surfaces 7 and 8 is made stronger, the ESL of the laminated capacitor 1 can be further reduced.

SUMMARY OF THE INVENTION

In order to overcome the problems described above, preferred embodiments of the present invention provide a laminated capacitor having a greatly reduced ESL.

In addition, preferred embodiments of the present invention provide a printed circuit board, a decoupling circuit, and a high-frequency circuit all including such a novel laminated capacitor.

A laminated capacitor according to a preferred embodiment of the present invention includes a substantially rectangular capacitor body having two opposite main surfaces, and two opposite side surfaces connected to the main surfaces and extending in a longer-side direction of the main surfaces, and two opposite end surfaces connecting the main surfaces and extending in a shorter-side direction of the main surfaces.

The capacitor body includes a plurality of dielectric layers extending in the direction of the main surfaces, and at least a pair of the first and the second internal electrodes facing each other across a specific dielectric layer to define a capacitor unit. The first and the second internal electrodes respectively include the first and the second lead electrodes extending onto the side surfaces and the end surfaces of the capacitor body.

The first external terminal electrodes electrically connected to the first internal electrode through the first lead electrodes and the second external terminal electrodes electrically connected to the second internal electrode through the second lead electrodes are disposed on the side surfaces and the end surfaces of the capacitor body.

At least two first external terminal electrodes are disposed on each of the side surfaces and at least one first external terminal electrode is disposed on each of the end surfaces.

At least two second external terminal electrodes are disposed on each of the side surfaces so as to be arranged alternately with the first external terminal electrodes and at least one second external terminal electrode is disposed on each of the end surfaces so as to be disposed alternately with the first external terminal electrode.

The number of the first and the second external terminal electrodes disposed on the side surfaces is larger than that of the first and the second external terminal electrodes disposed on the end surfaces.

To solve the above-described technical problems, the laminated capacitor of various preferred embodiments of the present invention having the above-described structure has a feature in which an end-surface pitch defining the interval between adjacent first and second external terminal electrodes disposed on the end surfaces is equal to or less than about 0.9 times of a side-surface pitch defining the interval between adjacent first and second external terminal electrodes disposed on the side surfaces.

In another preferred embodiment of the present invention, an end-surface pitch defining the interval between adjacent first and second lead electrodes electrically connected to the first and the second external terminal electrodes disposed on the end surfaces is equal to or less than about 0.9 times of a side-surface pitch defining the interval between adjacent first and second lead electrodes electrically connected to the first and the second external terminal electrodes disposed on the side surfaces.

The features in the above-described preferred embodiments of the present invention may be combined. More specifically, the end-surface pitch of the lead electrodes may be equal to or less than about 0.9 times of the side-surface pitch of the lead electrodes, while the end-surface pitch of the external terminal electrodes is equal to or less than about 0.9 times of the side-surface pitch of the external terminal electrodes.

The smaller ratio of the end-surface pitch to the side-surface pitch is set, such as about 0.8 times or smaller, or further, about 0.6 times or smaller, the more advantageous it is in order to enhance the effect of magnetic-flux cancellation. On the other hand, when a smaller ratio is used, the interval between adjacent first and second external terminal electrodes becomes small, which may cause an electric short circuit. Therefore, when the ESL is reduced according to preferred embodiments of the present invention, it is preferred that the end-surface pitch be set as small as possible such that an electric short circuit does not occur between adjacent first and second external terminal electrodes.

In preferred embodiments of the present invention, it is preferred that all the first external terminal electrodes and all the second external terminal electrodes be arranged alternately along the two side surfaces and the two end surfaces.

A laminated capacitor according to a preferred embodiment of the present invention is advantageously used as a decoupling capacitor connected to a power-supply circuit for an MPU chip provided for a micro-processing unit.

Preferred embodiments of the present invention can also be applied to a printed circuit board upon which the above-described laminated capacitor is mounted.

As described above, when preferred embodiments of the present invention are applied to a printed circuit board, in another specific preferred embodiment, an MPU chip provided for a micro-processing unit is further mounted on the printed circuit board.

Preferred embodiments of the present invention can also be applied to a decoupling circuit provided with the above-described laminated capacitor.

Preferred embodiments of the present invention can further be applied to a high-frequency circuit provided with the above-described laminated capacitor.

As described above, in a laminated capacitor according to various preferred embodiments of the present invention, an end-surface pitch which defines the interval between adjacent first and second external terminal electrodes disposed on the end surfaces of the body of the capacitor is equal to or less than about 0.9 times of a side-surface pitch which defines the interval between adjacent first and second external terminal electrodes disposed on the side surfaces. Alternatively, an end-surface pitch which defines the interval between adjacent first and second lead electrodes electrically connected to the first and the second external terminal electrodes disposed on the end surfaces is equal to or less than about 0.9 times of a side-surface pitch which defines the interval between adjacent first and second lead electrodes electrically connected to the first and the second external terminal electrodes disposed on the side surfaces. Therefore, the following advantages can be obtained.

The effect of magnetic-flux cancellation is greatly improved in the vicinity of the end surfaces, where a smaller number of external terminal electrodes are disposed. In addition, since the pitch between the first and the second external terminal electrodes is smaller on the side of the end surfaces, shorter than the side surfaces, current paths generated between the first and the second external terminal electrodes adjacent astride the end surfaces and the side surfaces are not very long. Therefore, the ESL of the whole laminated capacitor is effectively reduced.

Thus, the resonant frequency of the laminated capacitor can be made higher. This means that the laminated capacitor functions as a capacitor in a higher frequency band. Therefore, a laminated capacitor according to preferred embodiments can be used in electronic circuits operating in higher frequencies, and can be advantageously used, for example, as a bypass capacitor or a decoupling capacitor in high-frequency circuits.

Decoupling capacitors used in micro-processing units (MPUs) are required to function as a quick power supply. Since a laminated capacitor according to preferred embodiments of the present invention is effectively made to have a very low ESL, when the laminated capacitor is used for such a purpose, it provides a sufficiently quick response.

In preferred embodiments of the present invention, when all the first external terminal electrodes and all the second external terminal electrodes are disposed alternately along the two side surfaces and the two end surfaces, the effect of magnetic-flux cancellation is greatly improved, which is effective in reducing the ESL.

Other features, elements, characteristics and advantages of the present invention will become more apparent form the following detailed description of preferred embodiments with reference to the attached drawings.

BRIEF DESCRIPTION OF THE DRAWINGS

FIG. 2A is a plan view of a cross-section where the first internal electrode 30 is provided, and FIG. 2B is a plan view of a cross-section where the second internal electrode 31 is provided.

DETAILED DESCRIPTION OF PREFERRED EMBODIMENTS

Figure 1:
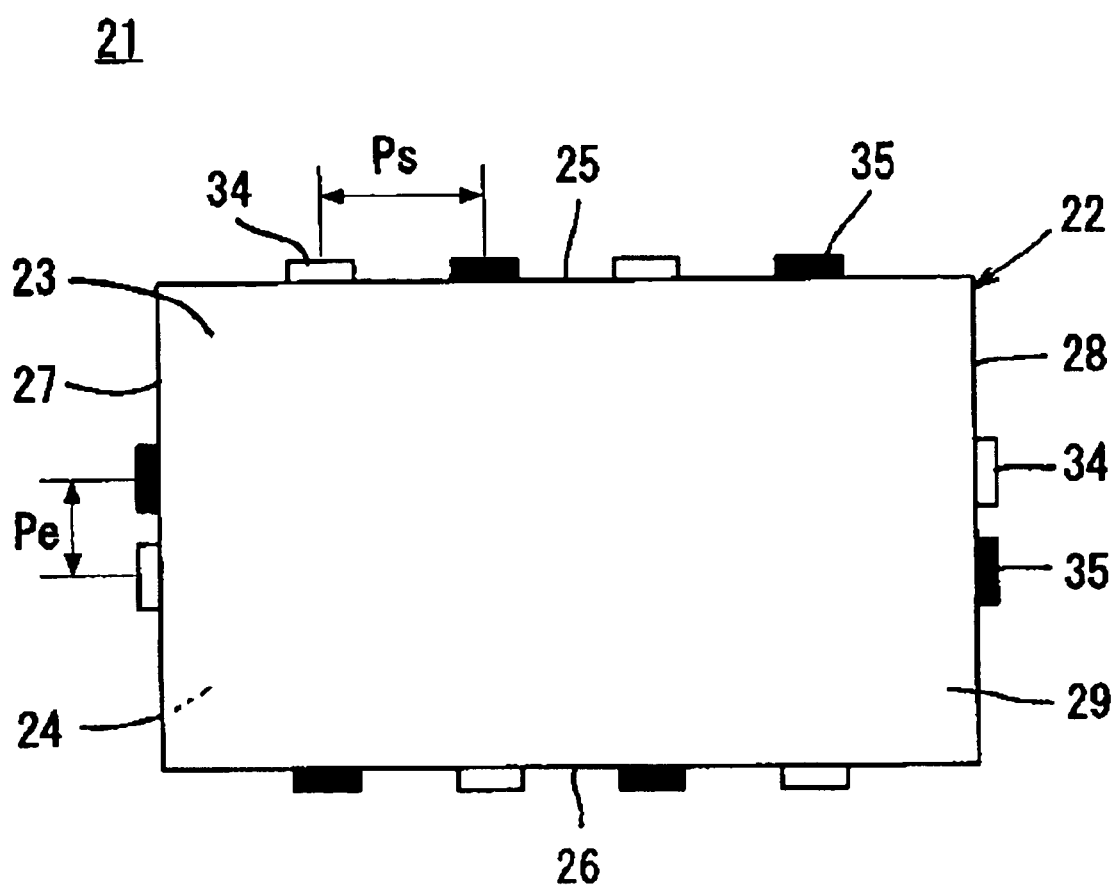
FIG. 1 is a plan view showing the appearance of a laminated capacitor 21 according to a preferred embodiment of the present invention.
Figure 2A:
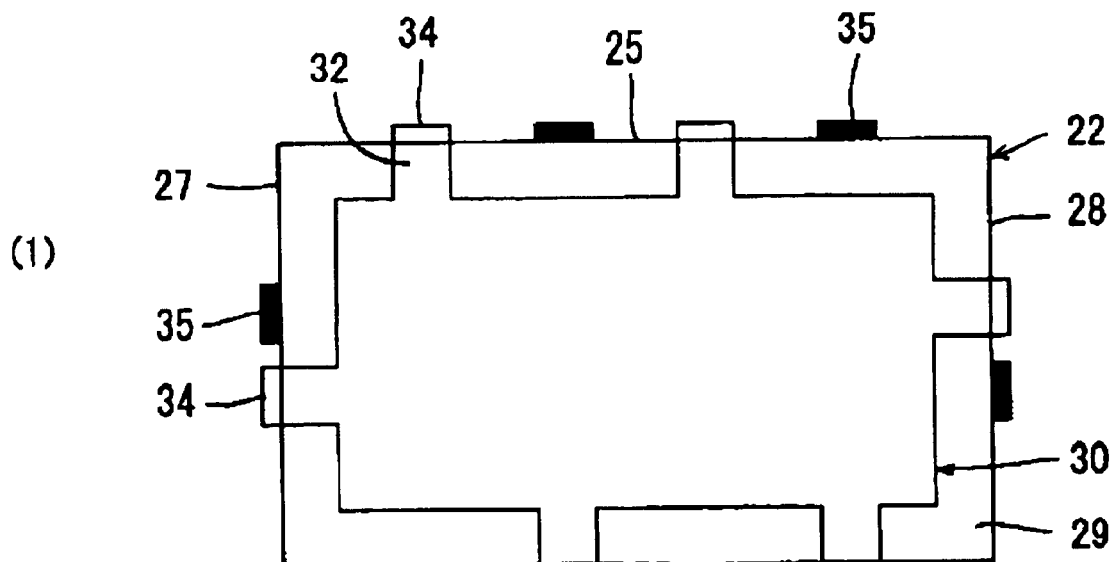
FIG. 2A and FIG. 2B show internal structures of the laminated capacitor 21 shown in FIG. 1.
Figure 2B:
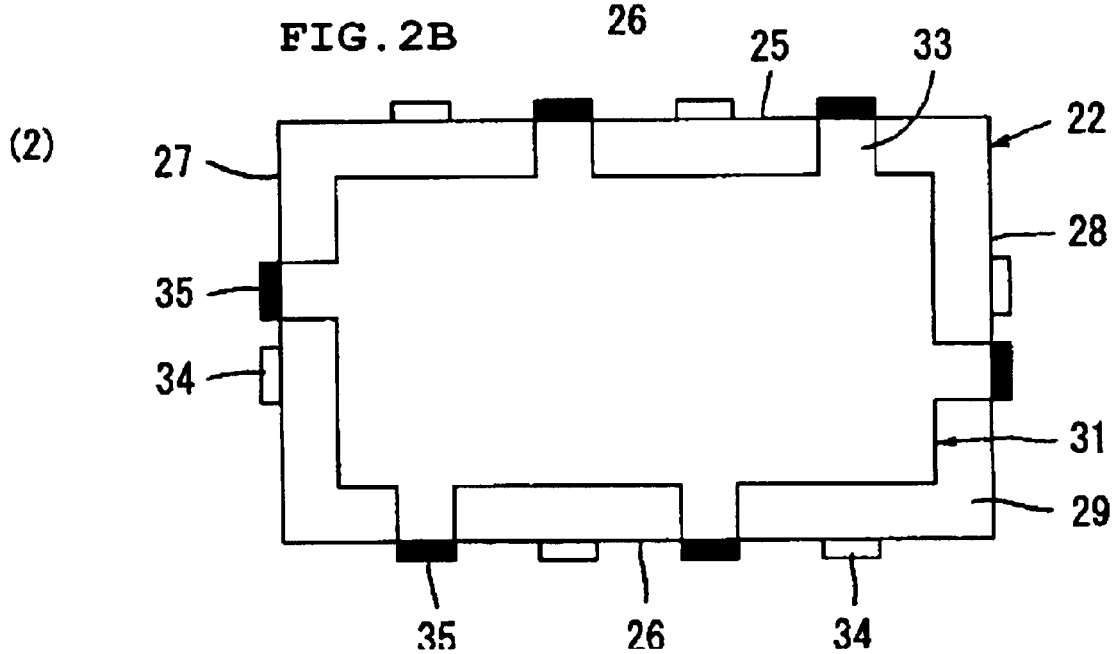
Figure 3:
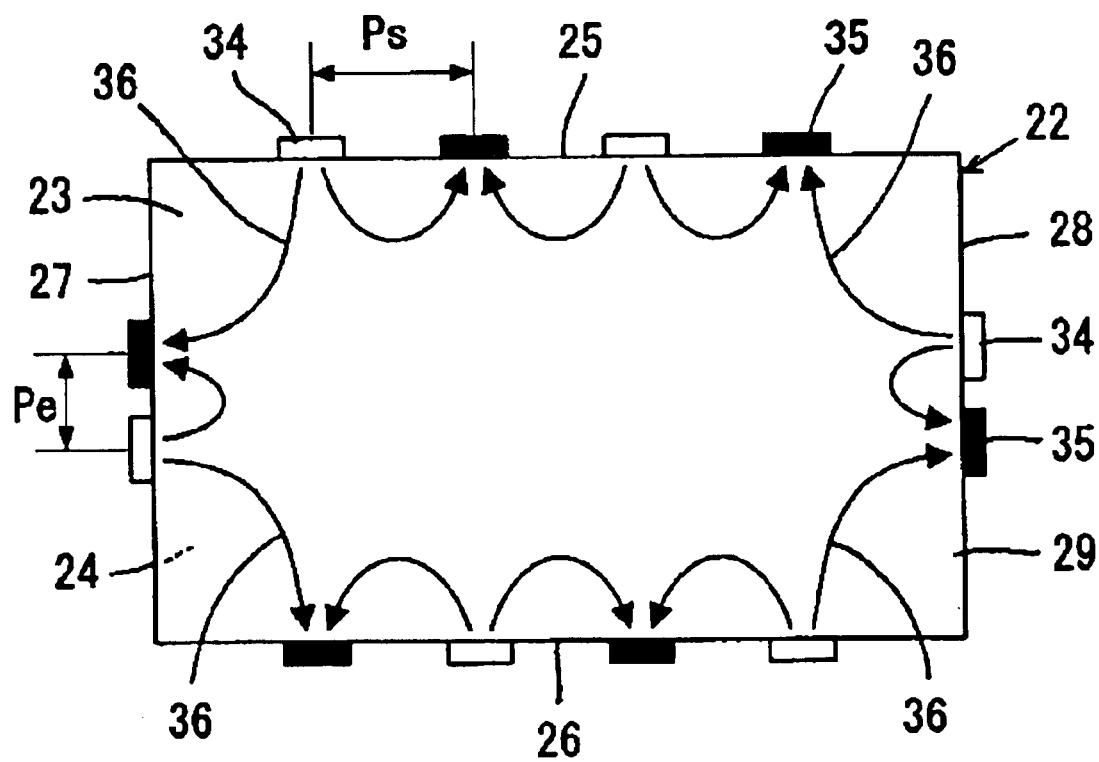
FIG. 3 is a plan view showing the appearance of the laminated capacitor 21, in which arrows illustrating the paths and directions of current flowing through the laminated capacitor 21 are added to FIG. 1.

A laminated capacitor 21 according to a preferred embodiment of the present invention will be described below in FIG. 1 to FIG. 3. FIG. 1 is a plan view showing a rough appearance of the laminated capacitor 21. FIG. 2A and FIG. 2B are sectional views along different sections showing inside structures of the laminated capacitor 21. FIG. 3 is a corresponding view to FIG. 7.

The laminated capacitor 21 preferably includes a substantially rectangular capacitor body. The capacitor body 22 has two main surfaces 23 and 24 opposed to each other, and two side surfaces 25 and 26 opposed to each other and extending in the longer-side direction of the main surfaces 23 and 24, and two end surfaces 27 and 28 opposing each other and extending in the shorter-side direction of the main surfaces 23 and 24, the side surfaces and the end surfaces being connected to the main surfaces 23 and 24.

The capacitor body 22 is provided with a plurality of dielectric layers 29 made of dielectric ceramics, for example, and extending in the direction of the main surfaces 23 and 24, and is also provided therein with at least a pair of first and second internal electrodes 30 and 31 facing each other across a specific dielectric layer 29 in order to define a capacitor unit.

FIG. 2A shows the first internal electrode 30, and FIG. 2B shows the second internal electrode 31. FIG. 2A shows a cross-section where the first internal electrode 30 is provided, and FIG. 2B shows a cross-section where the second internal electrode 31 is provided.

The first internal electrode 30 has the first lead electrodes 32 extending onto the side surfaces 25 and 26 and the end surfaces 27 and 2B of the capacitor body 22, and the second internal electrodes 31 has the second lead electrodes 33 extending onto the side surfaces 25 and 26 and the end surfaces 27 and 28 of the capacitor body 22.

The first external terminal electrodes 34 electrically connected to the first internal electrode 30 via the first lead electrodes 32 are disposed on the side surfaces 25 and 26 and the end surfaces 27 and 28 of the capacitor body 22, and the second external terminal electrodes 35 electrically connected to the second internal electrode 31 via the second lead electrodes 33 are also provided. To distinguish between the first external terminal electrodes 34 and the second external terminal electrodes 35 more easily in the figure, the first external terminal electrodes 34 are shown in white, and the second external terminal electrodes 35 are shown in black.

At least two first external terminal electrodes 34 are disposed on each of the side surfaces 25 and 26, and at least one is disposed on each of the end surfaces 27 and 28. In this preferred embodiment, two first external terminal electrodes 34 are disposed on each of the side surfaces 25 and 26, and one is disposed on each of the end surfaces 27 and 28.

At least two second external terminal electrodes 35 are disposed on each of the side surfaces 25 and 26 so as to be arranged alternately with the first external terminal electrodes 34, and at least one second external terminal electrodes 35 is disposed on each of the end surfaces 27 and 28 so as to be arranged alternately with the first external terminal electrodes 34. In this preferred embodiment, two second external terminal electrodes 35 are disposed on each of the side surfaces 25 and 26, and one of the electrodes 35 is disposed on each of the end surfaces 27 and 28.

Since the number of the first and the second external terminal electrodes 34 and 35 disposed on the side surfaces 25 and 26 and the end surfaces 27 and 28 is determined as described above, the total number of the first and the second external terminal electrodes 34 and 35 disposed on each of the side surfaces 25 and 26, which is four, is larger than the total number of the first and the second external terminal electrodes 34 and 35 disposed on each of the end surfaces 27 and 28, which is two.

In this preferred embodiment, since the first external terminal electrodes 34 and the second external terminal electrodes 35 are adjacent to each other astride each of the side surfaces 25 and 26 and each of the end surfaces 27 and 28, all the first external terminal electrodes 34 and all the second external terminal electrodes 35 are disposed alternately along the side surfaces 25 and 26 and the end surfaces 27 and 28.

In addition, in this preferred embodiment, the arrangement of the first and the second external terminal electrodes 34 and 35 on the side surfaces 25 and 26 and the end surfaces 27 and 28 is well-balanced. More specifically, the first and the second external terminal electrodes 34 and 35 are arranged so as to have substantially the same length from the ends of the side surfaces 25 and 26, and also arranged so as to have substantially the same length from the ends of the end surfaces 27 and 28.

To allow the laminated capacitor 21 to have a larger capacitance, the number of opposite portions in the first internal electrode 30 and the second internal electrode 31 is generally set to an even number so as to define a plurality of capacitor units. These capacitor units are connected in parallel by the first and the second external terminal electrodes 34 and 35.

In the laminated capacitor 21 described above, an end-surface pitch Pe which defines the interval between adjacent first and second external terminal electrodes 34 and 35 disposed on the end surfaces 27 and 28 is preferably equal to or less than about 0.9 times of a side-surface pitch Ps which defines the interval between adjacent first and second external terminal electrodes 34 and 35 disposed on the side surfaces 25 and 26.

FIG. 3 shows typical paths and directions of current flowing through the laminated capacitor 21 by arrows. At the state and the point of time in FIG. 3, the current flows from each of the first external terminal electrodes 34 to each of the second external terminal electrodes 35.

In the vicinity of adjacent external terminal electrodes 34 and 35, the current flows from the first external terminal electrode 34 to the second external terminal electrode 35. Since the directions of the current between an adjacent pair of the first and the second external terminal electrodes 34 and 35 are opposite, the magnetic flux induced by the current is canceled.

Since the end-surface pitch Pe of the first and second external terminal electrodes 34 and 35 disposed on the end surfaces 27 and 28 is preferably equal to or less than about 0.9 times of the side-surface pitch Ps, the effect of magnetic-flux cancellation caused between adjacent first and second external terminal electrodes 34 and 35 disposed on the end surfaces 27 and 28 is stronger than the effect of magnetic-flux cancellation caused between adjacent first and second external terminal electrodes 34 and 35 disposed on the side surfaces 25 and 26. Consequently, even when the number of the first and second external terminal electrodes 34 and 35 disposed on the end surfaces 27 and 28 is smaller, the effect of magnetic-flux cancellation that is sufficient to compensate it can be obtained.

When the end-surface pitch Pe is made smaller, current paths 36, among the paths indicated by arrows in FIG. 3, which are; generated between adjacent first and second external terminal electrodes 34 and 35 either of which is disposed on one of the side surfaces 25 and 26 and the other of which is disposed on one of the end surfaces 27 and 28, become longer. Thus, an increase in the inductance ingredients caused thereby needs to be taken into consideration.

The end surfaces 27 and 28, however, are shorter than the side surfaces 25 and 26, so the current paths 36 do not become very long even when the end-surface pitch Pe is made smaller. Therefore, an increase in the inductance ingredients caused by the current paths 36 is not a big problem. Details thereof are described below with reference to FIG. 4.

Figure 4:
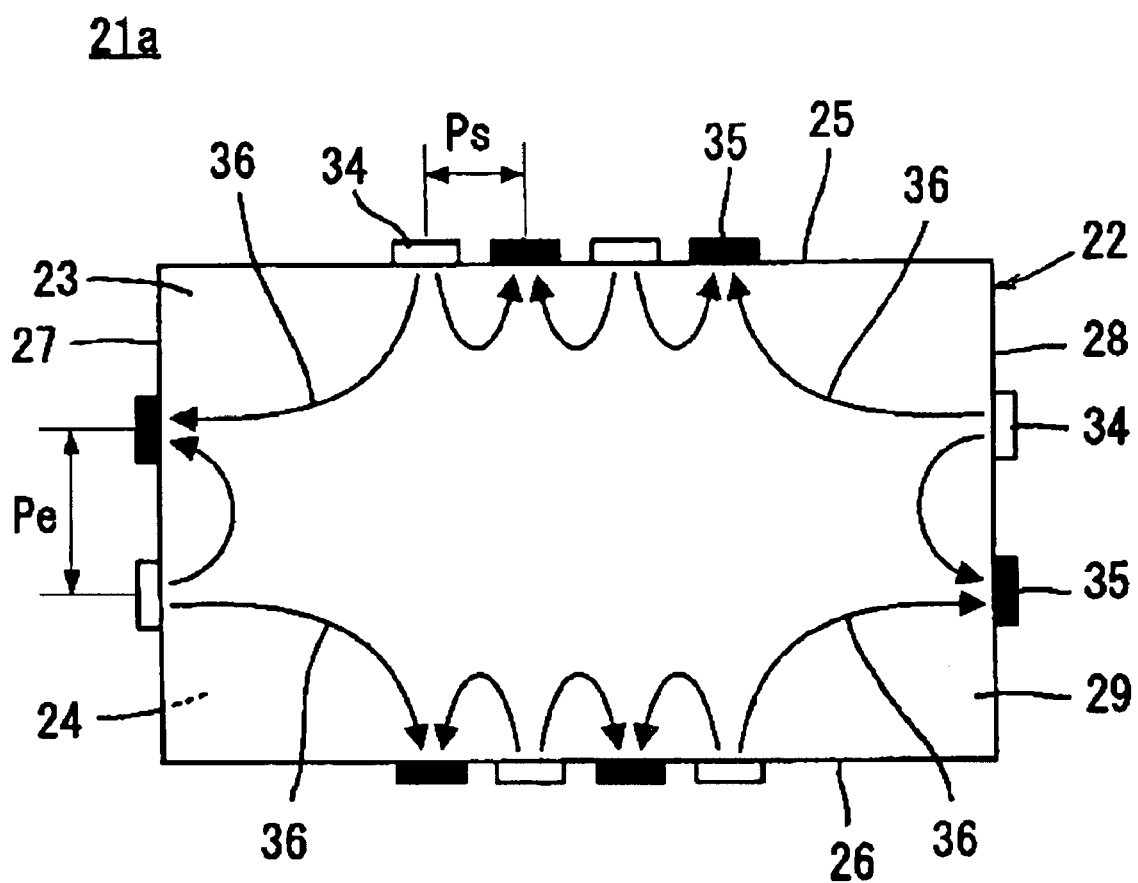
FIG. 4 is a plan view showing the appearance of a laminated capacitor 21a as a comparative example of the laminated capacitor 21 shown in FIG. 1.
Figure 5:
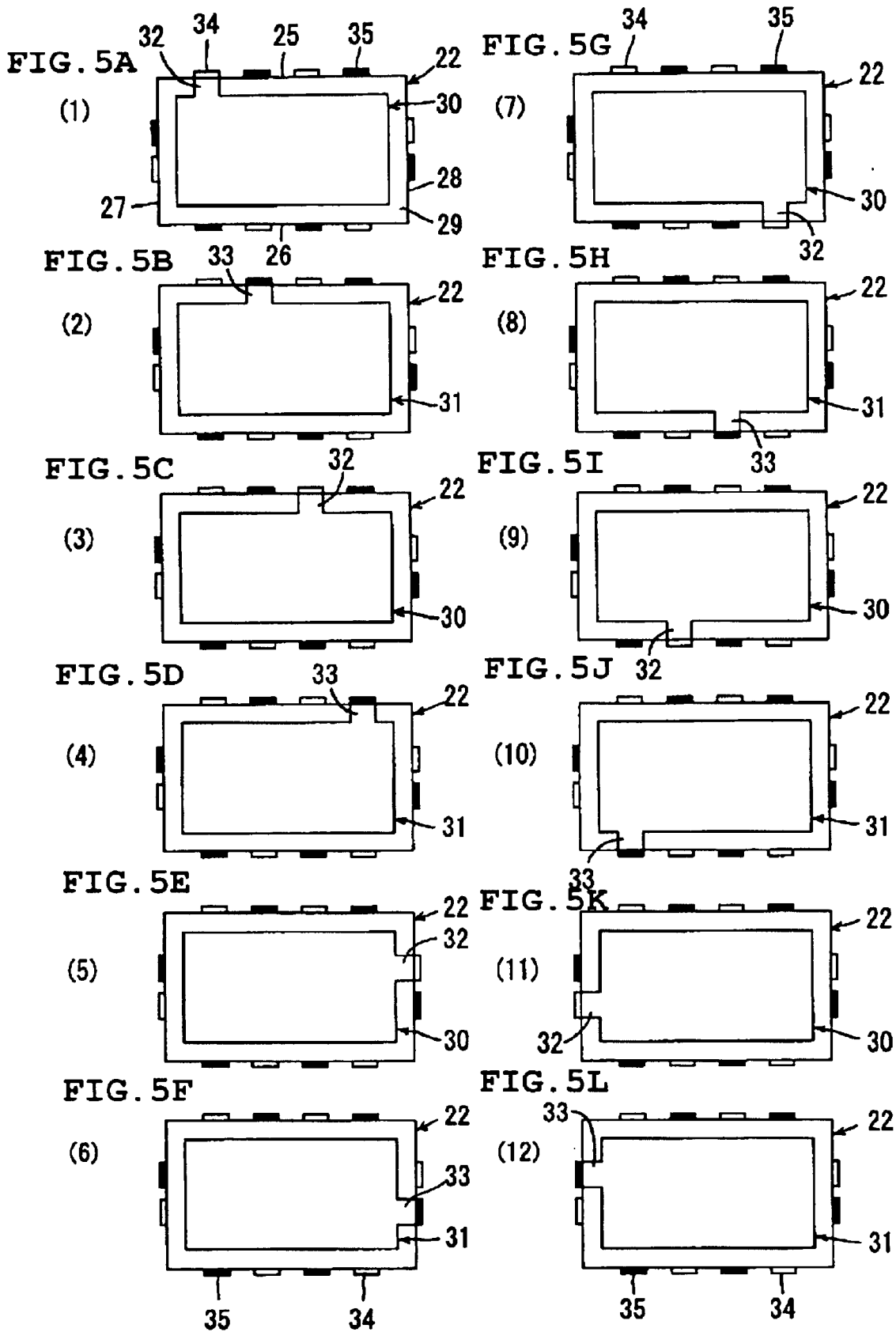
FIG. 5A to FIG. 5L, corresponding to FIG. 2A and FIG. 2B, show a modification example of preferred embodiments of formation of the first and the second lead electrodes 32 and 33 in the first and the second internal electrodes 30 and 31 shown in FIG. 2A and FIG. 2B.

FIG. 4 is a comparative example of the preferred embodiment shown in FIG. 3, and a corresponding figure to FIG. 3. In FIG. 4, the same reference symbols as those used in FIG. 3 are assigned to the elements corresponding to those shown in FIG. 3.

In a laminated capacitance 21a according to the comparative example shown in FIG. 4, the side-end pitch Ps of the first and the second external terminal electrodes 34 and 35 is made smaller than the end-surface pitch Pe of the first and the second external terminal electrodes 34 and 35. In such a structure, the effect of magnetic-flux cancellation in the vicinity of the side surfaces 25 and 26 is increased as compared with the case shown in FIG. 3.

In the laminated capacitance 21a shown in FIG. 4, however, current paths 36 between adjacent first and second external terminal electrodes 34 and 35 either of which is disposed on one of the side surfaces 25 and 26 and the other of which is disposed on one of the end surfaces 27 and 28 become longer than those shown in FIG. 3, and the inductance ingredients caused by the current paths 36 become larger. The number of the first and the second external terminal electrodes 34 and 35 disposed on the side surfaces 25 and 26 is relatively large. Therefore, there are many portions where the effect of magnetic-flux cancellation is expected, and a high effect of magnetic-flux cancellation can be obtained.

Hence, as in the comparative example shown in FIG. 4, in terms of improving the effect of magnetic-flux cancellation, it is disadvantageous that the current paths 36 are made longer, even with the side-surface pitch Ps made smaller, in order to increase the effect of magnetic-flux cancellation at the side surfaces 25 and 26. Therefore, as shown in FIG. 3, it is advantageous to make the end-surface pitch Pe smaller in order to enhance the effect of magnetic-flux cancellation and to increase the effect of reduction in ESL.

FIG. 5A to FIG. 5L, corresponding to FIG. 2A and FIG. 2B, show a modification example of preferred embodiments of formation of lead electrodes in internal electrodes. In FIG. 5A to FIG. 5L, the same reference symbols as those used in FIG. 2A and FIG. 2B are assigned to the elements corresponding to those shown in FIG. 2A and FIG. 2B, and overlapping description is omitted.

The first internal electrodes 30 are shown in FIG. 5A, FIG. 5C, FIG. 5E, FIG. 5G, FIG. 5I, and FIG. 5K, and the second internal electrodes 31 are shown in FIG. 5B, FIG. 5D, FIG. 5F, FIG. 5H, FIG. 5J, and FIG. 5L. The first and the second internal electrodes 30 and 31 are laminated in the order from FIG. 5A to FIG. 5L.

As shown in FIG. 5A to FIG. 5L, each of the first internal electrodes 30 has only one first lead electrode 32, and each of the second internal electrodes 31 has only one second lead electrode 33.

Even in the structure shown in FIG. 5A to FIG. 5L, when all the first external terminal electrodes 34 have the same potential and all the second external terminal electrodes 35 have the same potential, the laminated capacitor 21a can achieve the same functions and gain the same effects as the laminated capacitor 21 shown in FIG. 2A and FIG. 2B.

An intermediate preferred embodiment between the preferred embodiment shown in FIG. 2A and FIG. 2B and the preferred embodiment shown in FIG. 5A to FIG. 5L is also possible. That is, the number of the first lead electrodes 32 drawn from each of the internal electrodes 30 and the number of the second lead electrodes 33 drawn from each of the internal electrodes 31 may be modified so as to fall in the range between two and five.

An experimental example performed in order to determine the scope of the present invention and to confirm the effects of various preferred embodiments of the present invention will be described next.

In this experimental example, a laminated capacitor 21, having the structure described with reference to FIG. 1 to FIG. 3, and having a longer-side length of about 2.5 mm and a shorter-side length of about 1.5 mm of the main surfaces 23 and 24, was used as a sample. As indicated in Table 1, the side-surface pitch Ps and the end-surface pitch Pe were variously changed to make samples having different Pe/Ps values, and the ESLs of the samples were measured.

TABLE 1

| Sample No. | Side-surface pitch Ps | End-surface pitch Pe | Pe/Ps | ESL |
|---|---|---|---|---|
| 1 | 0.50 mm | 0.50 mm | 1 | 30 pH |
| 2 | 0.50 mm | 0.80 mm | 1.6 | 32 pH |
| 3 | 0.50 mm | 0.60 mm | 1.2 | 31 pH |
| 4 | 0.50 mm | 0.45 mm | 0.9 | 28 pH |
| 5 | 0.50 mm | 0.40 mm | 0.8 | 27 pH |
| 6 | 0.50 mm | 0.30 mm | 0.6 | 26 pH |
| 7 | 0.40 mm | 0.50 mm | 1.25 | 32 pH |
| 8 | 0.30 mm | 0.50 mm | 1.67 | 33 pH |

Figure 7:
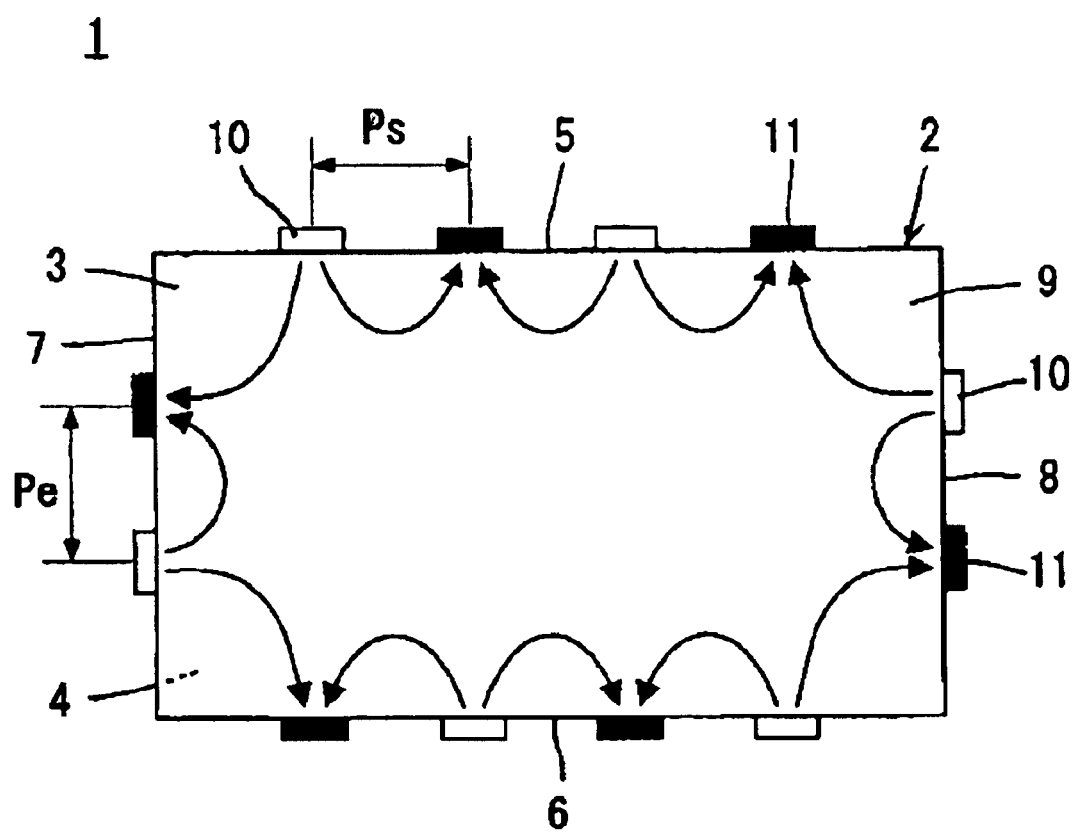
FIG. 7, corresponding to FIG. 3, is a plan view showing the appearance of a conventional laminated capacitor 1, related to the present invention.

In Table 1, sample 1 corresponds to the conventional laminated capacitor 1 as shown in FIG. 7. Therefore, by comparison with 30 pH, the ESL value obtained in sample 1, it can be determined whether the ESL is reduced or not.

When the end-surface pitch Pe was made larger than that of sample 1 with the side-surface pitch Ps being the same as that of sample 1, as in samples 2 and 3, the ESL was higher than that of sample 1.

When the side-surface pitch Ps was made smaller than that of sample 1 with the end-surface pitch Pe being the same as that of sample 1, as in samples 7 and 8, the ESL was also higher than that of sample 1.

In contrast, when the end-surface pitch Pe was made smaller than that of sample 1 with the side-surface pitch Ps being the same as that of sample 1 so as to make PE/Ps equal to or smaller than about 0.9, as in samples 4 to 6, the ESL was lower than that of sample 1. It is known from this experiment that the end-surface pitch Pe should be equal to or less than about 0.9 times of the side-surface pitch Ps in order to reduce the ESL.

Additionally, comparisons among samples 4 to 6 shows that the ESL is reduced as the ratio Pe/Ps gets smaller. Therefore, it is known that a smaller Pe/Ps is more preferable.

Figure 6:
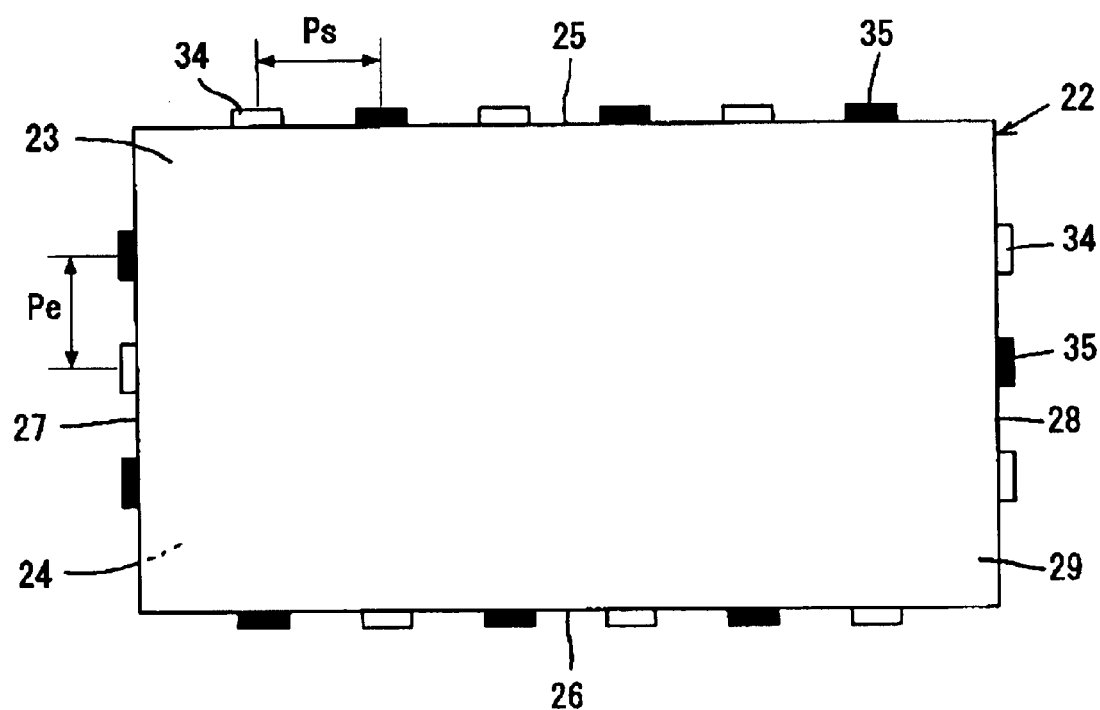
FIG. 6, corresponding to FIG. 1, is a plan view showing the appearance of a laminated capacitor 41 according to another preferred embodiment of the present invention.

To enhance the reliability of the experimental results mentioned above, a similar experiment was performed with a laminated capacitor 41 shown in FIG. 6, corresponding to FIG. 1. In FIG. 6, the same reference symbols as those used in FIG. 1 are assigned to the elements corresponding to those shown in FIG. 1, and repetitious description thereof is omitted.

In the laminated capacitor 41 shown in FIG. 6, three first external terminal electrodes 34 and three second external terminal electrodes 35 are disposed on each of the side surfaces 25 and 26 of the body 22 of the capacitor. One first external terminal electrode 34 and two second external terminal electrodes 35 are disposed on one end surface 27, and two first external terminal electrodes 34 and one second external terminal electrode 35 are disposed on the other end surface 28.

The laminated capacitor 41 had a longer-side length of about 3.5 mm and a shorter-side length of about 2.0 mm in main surfaces 23 and 24. As indicated in Table 2, a side-surface pitch Ps and an end-surface pitch Pe were variously changed to make samples having different Pe/Ps values, and the ESLs of the samples were measured.

TABLE 2

| Sample No. | Side-surface pitch Ps | End-surface pitch Pe | Pe/Ps | ESL |
|---|---|---|---|---|
| 9 | 0.50 mm | 0.50 mm | 1 | 15 pH |
| 10 | 0.50 mm | 0.45 mm | 0.9 | 12 pH |
| 11 | 0.40 mm | 0.50 mm | 1.25 | 16 pH |

In Table 2, sample 9 corresponds to sample 1 shown in Table 1, and has a Pe/Ps value of "1". Therefore, by comparison with 15 pH, the ESL value obtained in sample 9, it can be determined whether the ESL is reduced or not.

Sample 11 had the same end-surface pitch Pe as sample 9 and a smaller side-surface pitch Ps than sample 9. As a result, sample 11 had a higher ESL than sample 9.

In contrast, sample 10 had the same end-surface pitch Pe as sample 9 and a smaller side-surface pitch Ps than sample 9 so as to make the ratio Pe/Ps about 0.9. As a result, sample 10 had a lower ESL than sample 9. That is, the ESL was reduced.

Laminated capacitors according to the present invention have been described in reference to various preferred embodiments with drawings thereof. Within the scope of the present invention, various modifications can be made.

For example, the number of lead electrodes in internal electrodes may be modified. The number of external terminal electrodes may also be modified.

In the above descriptions, the end-surface pitch Pe and the side-surface pitch Ps are related to the first and the second external terminal electrodes 34 and 35. Even in case of these pitches Pe and Ps related to the first and second lead electrodes 32 and 33, the ESL is reduced in the same way if the end-surface pitch Pe is equal to or less than about 0.9 times of the side-surface pitch Ps.

A printed circuit board, a decoupling circuit, and a high-frequency circuit structured by using a laminated capacitor according to other preferred embodiments of the present invention will be described next.

Figure 8:
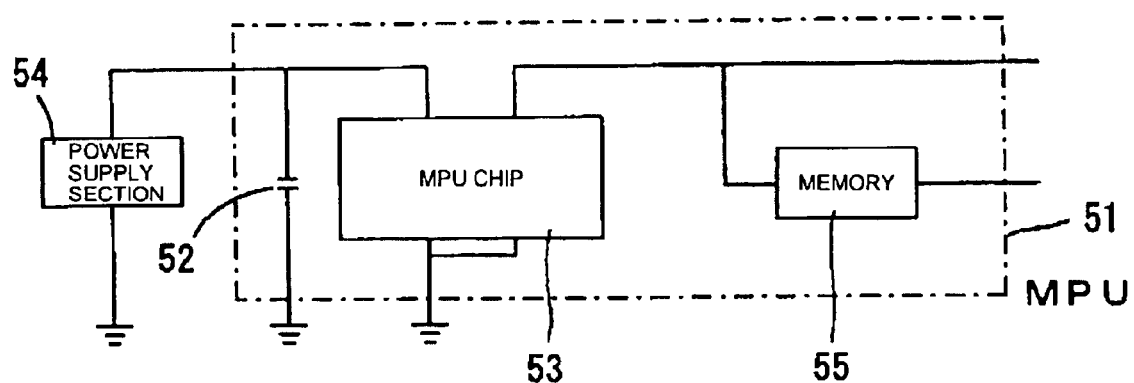
FIG. 8 is a block diagram illustrating an example of the connection structure between an MPU chip 53 in an MPU 51 where a laminated capacitor according to a preferred embodiment of the present invention is used as a decoupling capacitor 52, and a power-supply section 54 supplying power thereto.

A laminated capacitor according to preferred embodiments of the present invention can be, for example, used advantageously as a decoupling capacitor 52 provided for a micro-processing unit (MPU) 51 shown in FIG. 8. FIG. 8 is a block diagram illustrating an example of the connection structure between an MPU chip 53 of the MPU 51 in a workstation or a personal computer, and a power-supply section 54 supplying power thereto.

In FIG. 8, the MPU 51 is provided with the MPU chip (bare chip) 53 and a memory 55. The power-supply section 54 supplies power to the MPU chip 53, and the decoupling capacitor 52 is connected to a power-supply circuit from the power-supply section 54 to the MPU chip 53. At the side of the MPU 53 connected to the memory 55, a signal circuit is provided.

The decoupling capacitor 52 used in the MPU 51 is used for noise absorption and rectification of power fluctuation, in the same way as usual decoupling capacitors. Further, it is planned to operate the MPU chip 53 at an operating frequency of more than 500 MHz or nearly 1 GHz. In such a case where a quick operation is required for the MPU 53, the decoupling capacitor needs to provide a quick-power-supply function (in other words, the function to supply the electric power within several nanoseconds from electricity charged in the capacitor when electric power is immediately required during a start-up operation).

Consequently, it is necessary for the decoupling capacitor 52 in the MPU 51 to have an inductance ingredient that is as low as possible. Therefore, a laminated capacitor according to preferred embodiments of the present invention is advantageously used as the decoupling capacitor 52.

The first example structure of an MPU in which laminated capacitors according to a preferred embodiment of the present invention is used as decoupling capacitors as described above, will be described below with reference to FIG. 9 to FIG. 11.

Figure 9:
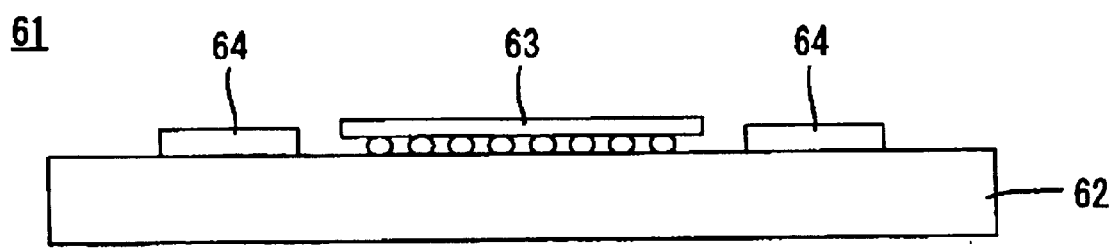
FIG. 9 is an outlined elevation of the cross-section showing the first example structure of an MPU 61 where a laminated capacitor 64 according to a preferred embodiment of the present invention is used as decoupling capacitors.
Figure 10:
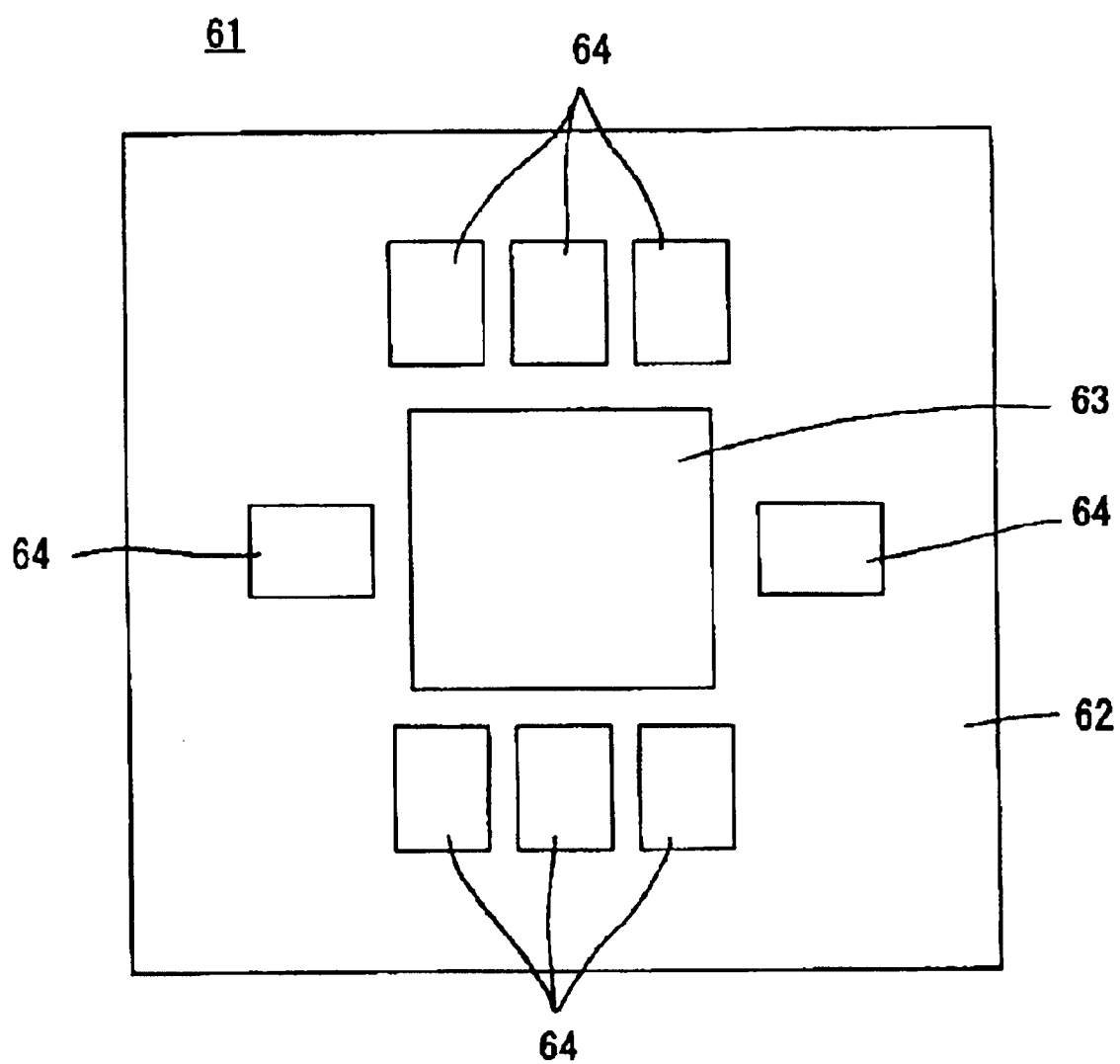
FIG. 10 is a plan view of the MPU 61 shown in FIG. 9.

FIG. 9 is an outlined elevation of a cross section of MPU 61, and FIG. 10 is a plan view of the MPU 61. As shown in FIG. 9 and FIG. 10, the MPU 61 is provided with a printed circuit board 62 having a multi-layer structure, for example, and an MPU chip (bare chip) 63 is mounted at the upper surface of the printed circuit board 62 by bump connections, for example.

On the printed circuit board 62, laminated capacitors 64 defining decoupling capacitors are surface-mounted in the vicinity of the MPU chip 63. As these laminated capacitors 64, the laminated capacitor 21 or 41 described above, of which the ESL has been reduced, can be used.

As shown in FIG. 10, eight laminated capacitors 64, for example, are mounted on the printed circuit board 62. When the eight laminated capacitors 64 are connected in parallel to each other, the ESL thereof is further reduced. For these laminated capacitors 64, via-hole conductors, not shown, provided within the printed circuit board 62 are used to connect mutually between the laminated capacitors 64 and to connect the MPU chip 63 with the laminated capacitors 64.

It is preferred that the laminated capacitors 64 be disposed very close to the MPU chip 63, as shown in FIG. 10, to reduce the inductance ingredients caused by the connections between the laminated capacitors 64 and the MPU chip 63, as much as possible.

Figure 11:
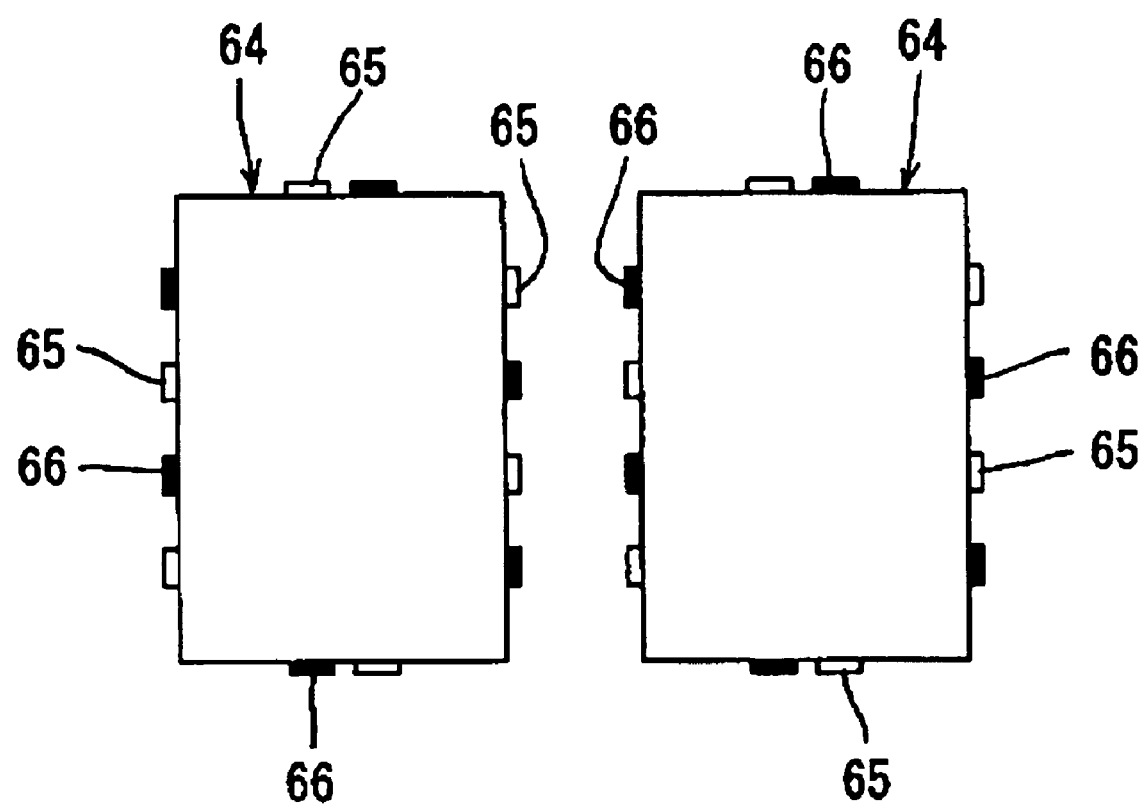
FIG. 11 is a plan view showing adjacent laminated capacitors among the ones shown in FIG. 10.

FIG. 11 is a plan view of adjacent capacitors among the laminated capacitors 64 shown in FIG. 10. Though in FIG. 9 and FIG. 10 external terminal electrodes provided for the laminated capacitors 64 are not shown, in FIG. 11, external terminal electrodes 65 and 66 are illustrated. To distinguish the first and the second external terminal electrodes 65 and 66 having polarities different from each other in FIG. 11, the first external terminal electrodes 65 are shown in white whereas the second external terminal electrodes 66 are shown in black in the same way as in FIG. 1.

When laminated capacitors 64 are disposed adjacent to each other as in FIG. 11, if the first external terminal electrode 65 of one of the laminated capacitors 64 is disposed opposite, and close to the second external terminal electrode 66 of the other laminated capacitor 64, the effect of magnetic-flux cancellation is also expected between the first and second external terminal electrodes 65 and 66. And the ESL of the capacitors is further reduced.

The second example structure of an MPU in which laminated capacitors according to preferred embodiments of the present invention are used as decoupling capacitors will be described below with reference to FIG. 12 and FIG. 13.

Figure 12:
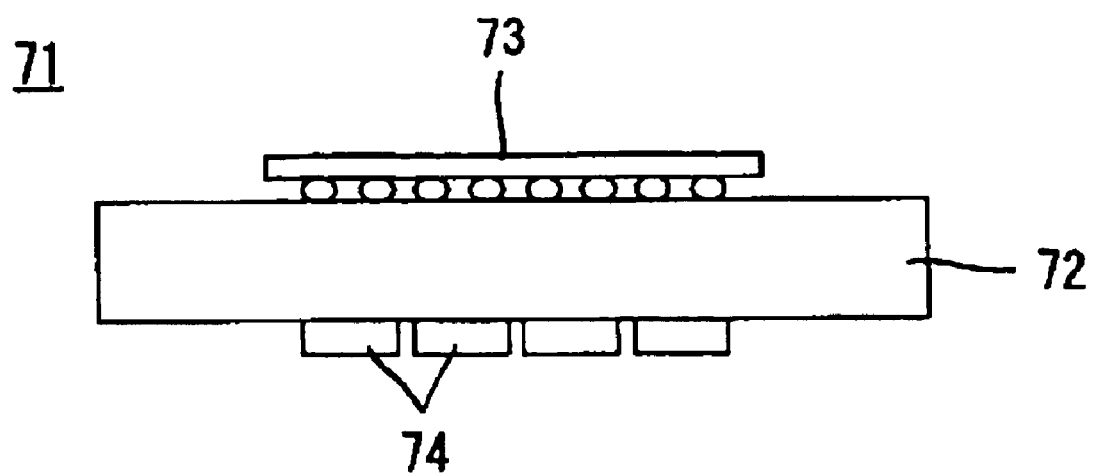
FIG. 12 is an outlined elevation of cross-section showing the second example structure of an MPU 71 where laminated capacitors 74 according to a preferred embodiment of the present invention are used as decoupling capacitors.

FIG. 12 is an outlined elevation of a cross section of an MPU 71. FIG. 13 is a bottom view of the MPU 71. In the same way as in the case shown in FIG. 9 and FIG. 10, the MPU 71 is provided with a printed circuit board 72 having a multi-layer structure, for example, and an MPU chip 73 is mounted at the upper surface of the printed circuit board 72 by bump connections, for example.

On the lower surface of the printed circuit board 72, laminated capacitors 74 defining decoupling capacitors are surface-mounted. As the laminated capacitors 74, the laminated capacitor 21 or 41 described above, of which the ESL has been reduced, can be used in the same way as in the case shown in FIG. 9 and FIG. 10.

Figure 13:
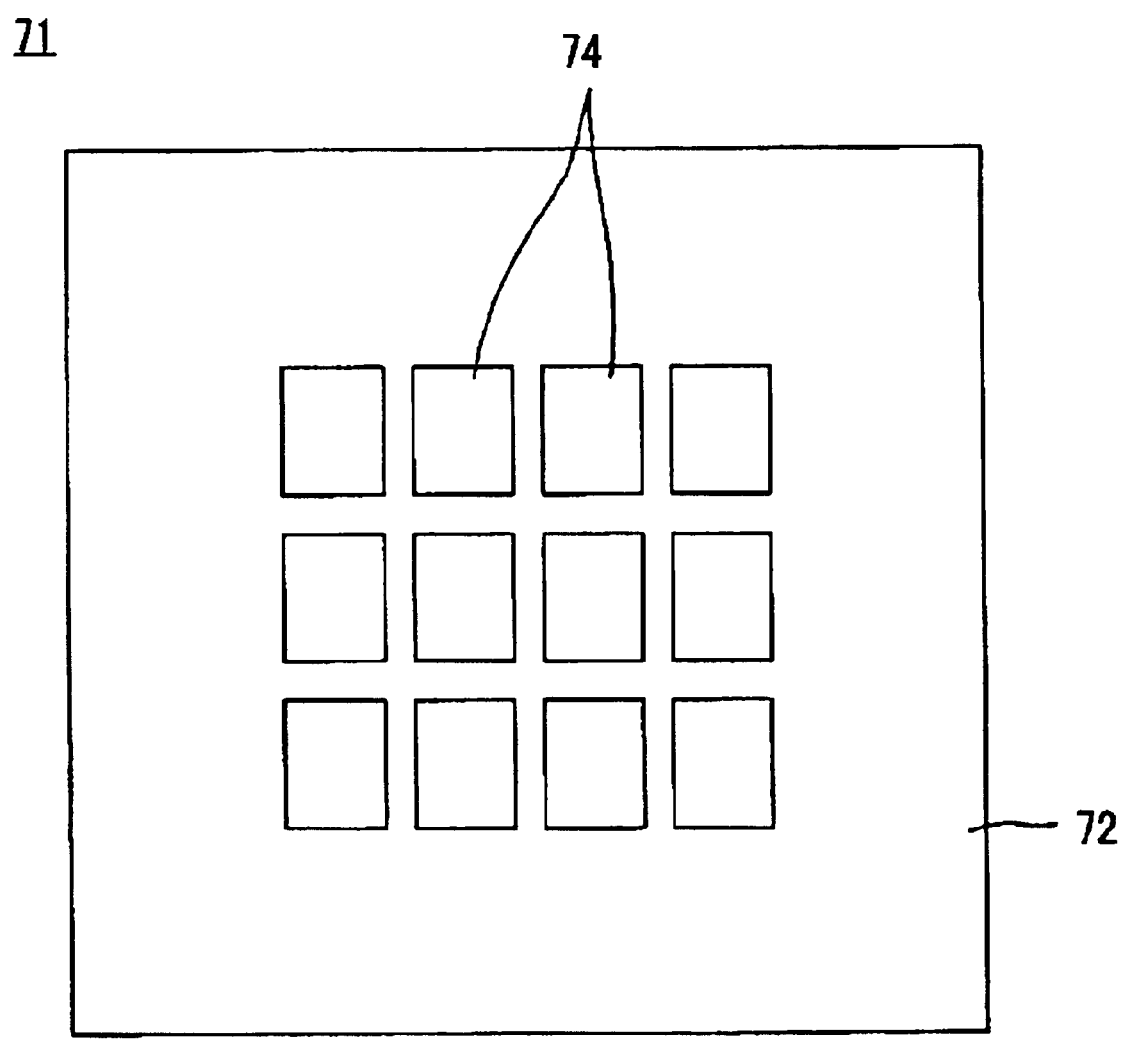
FIG. 13 is a bottom view of the MPU 71 shown in FIG. 12.

Also, as shown in FIG. 13, twelve laminated capacitors 64, for example, are mounted on the lower surface of the printed circuit board 72. When the twelve laminated capacitors 74 are connected in parallel to each other, the ESL thereof is further reduced. For these laminated capacitors 74, via-hole conductors, not shown, provided within the printed circuit board 72 are used to connect mutually between the laminated capacitors 74 and to connect the MPU chip 73 with the laminated capacitors 74 in the same way as in the case shown in FIG. 9 and FIG. 10.

Furthermore, it is preferred that the laminated capacitors 74 be disposed facing the position where the MPU chip 73 is mounted across the printed circuit board 72, as shown in FIG. 13, in order to reduce the inductance ingredients caused by the wiring between the laminated capacitors 74 and the MPU chip 73, as much as possible.

For these laminated capacitors 74, although not specifically shown in the drawings, it is also preferred that the external terminal electrodes be disposed as the arrangement shown in FIG. 11.

Additionally, the MPU 71 shown in FIG. 12 and FIG. 13 may be configured such that a cavity is formed at the lower surface side of the printed circuit board 72, and the laminated capacitors 74 are accommodated within the cavity.

Laminated capacitors according to preferred embodiments of the present invention can be used not only in decoupling circuits for MPUs, as described above, but also as bypass capacitors or decoupling capacitors in high-frequency circuits.

The present invention is not limited to each of the above-described preferred embodiments, and various modifications are possible within the range described in the claims. An embodiment obtained by appropriately combining technical features disclosed in each of the different preferred embodiments is included in the technical scope of the present invention.

What is claimed is:

1. A laminated capacitor comprising:
   a capacitor body having two opposite main surfaces, and two opposite side surfaces connected to the main surfaces and extending in a longer-side direction of the main surfaces, and two opposite end surfaces connected to the main surfaces and extending in a shorter-side direction of the main surfaces; wherein
   the capacitor body includes a plurality of dielectric layers extending in the direction of the main surfaces, and at least a pair of first and second internal electrodes facing each other across a specific dielectric layer of the dielectric layers so as to define a capacitor unit;
   the first and the second internal electrodes have first and second lead electrodes, respectively, extending onto the side surfaces and the end surfaces of the capacitor body;

first external terminal electrodes electrically connected to the first internal electrodes via the first lead electrodes and second external terminal electrodes electrically connected to the second internal electrodes via the second lead electrodes are respectively disposed on the side surfaces and the end surfaces of the capacitor body;

at least two of the first external terminal electrodes are disposed on each of the side surfaces and at least one of the first external terminal electrodes is disposed on each of the end surfaces;

at least two of the second external terminal electrodes are disposed on each of the side surfaces so as to be arranged alternately with the first external terminal electrodes, and at least one of the second external terminal electrodes is disposed on each of the end surfaces so as to be arranged alternately with the first external terminal electrode;

the number of the first and the second external terminal electrodes disposed on the side surfaces is larger than the number of the first and the second external terminal electrodes disposed on the end surfaces; and an end-surface pitch which defines an interval between adjacent first and second external terminal electrodes disposed on the end surfaces is equal to or less than about 0.9 times of a side-surface pitch which defines an interval between adjacent first and second external terminal electrodes disposed on the side surfaces.

2. A laminated capacitor according to claim 1, wherein an end-surface pitch which defines an interval between adjacent ones of the first and second lead electrodes electrically connected to the first and the second external terminal electrodes disposed on the end surfaces is equal to or less than about 0.9 times of a side-surface pitch which defines an interval between adjacent ones of the first and second lead electrodes electrically connected to the first and the second external terminal electrodes disposed on the side surfaces.

3. A laminated capacitor according to claim 1, wherein the capacitor body is substantially rectangular.

4. A laminated capacitor according to claim 1, wherein all of the first external terminal electrodes and all of the second external terminal electrodes are disposed alternately along the two side surfaces and the two end surfaces.

5. A laminated capacitor according to claim 1, wherein the laminated capacitor is arranged to define a decoupling capacitor connected to a power-supply circuit for an MPU chip provided in a micro-processing unit.

6. A printed circuit board comprising a laminated capacitor according to claim 1 mounted on a surface of the printed circuit board.

7. A printed circuit board according to claim 6, further comprising an MPU chip provided for a micro-processing unit mounted on the surface of the printed circuit board.

8. A decoupling circuit comprising a laminated capacitor according to claim 1.

9. A high-frequency circuit comprising a laminated capacitor according to claim 1.

10. A laminated capacitor comprising:

a capacitor body having two opposite main surfaces, and two opposite side surfaces connecting the main surfaces and extending in a longer-side direction of the main surfaces, and two opposite end surfaces connecting the main surfaces and extending in a shorter-side direction of the main surfaces;

wherein the capacitor body includes a plurality of dielectric layers extending in the direction of the main surfaces, and at least a pair of first and second internal electrodes facing each other across a specific dielectric layer of the dielectric layers so as to define a capacitor unit;

the first and the second internal electrodes have first and second lead electrodes, respectively, extending onto the side surfaces and the end surfaces of the capacitor body;

first external terminal electrodes electrically connected to the first internal electrodes through the first lead electrodes and second external terminal electrodes electrically connected to the second internal electrodes through the second lead electrodes are disposed on the side surfaces and the end surfaces of the capacitor body;

at least two of the first external terminal electrodes are disposed on each of the side surfaces and at least one of the first external terminal electrodes is disposed on each of the end surfaces;

at least two of the second external terminal electrodes are disposed on each of the side surfaces so as to be arranged alternately with the first external terminal electrodes and at least one of the second external terminal electrodes is disposed on each of the end surfaces so as to be arranged alternately with the first external terminal electrode;

the number of the first and the second external terminal electrodes disposed on the side surfaces is larger than the number of the first and the second external terminal electrodes disposed on the end surfaces; and an end-surface pitch which defines an interval between adjacent first and second lead electrodes electrically connected to the first and the second external terminal electrodes disposed on the end surfaces is equal to or less than about 0.9 times of a side-surface pitch which defines an interval between adjacent first and second lead electrodes electrically connected to the first and the second external terminal electrodes disposed on the side surfaces.

11. A laminated capacitor according to claim 10, wherein an end-surface pitch which defines an interval between adjacent first and second external terminal electrodes disposed on the end surfaces is equal to or less than about 0.9 times of a side-surface pitch which defines an interval between adjacent first and second external terminal electrodes disposed on the side surfaces.

12. A laminated capacitor according to claim 10, wherein the capacitor body is substantially rectangular.

13. A laminated capacitor according to claim 10, wherein all of the first external terminal electrodes and all of the second external terminal electrodes are disposed alternately along the two side surfaces and the two end surfaces.

14. A laminated capacitor according to claim 10, wherein the laminated capacitor is arranged to define a decoupling capacitor connected to a power-supply circuit for an MPU chip provided in a micro-processing unit.

15. A printed circuit board comprising a laminated capacitor according to claim 10 mounted on a surface of the printed circuit board.

16. A printed circuit board according to claim 15, further comprising an MPU chip provided for a micro-processing unit mounted on the surface of the printed circuit board.

17. A decoupling circuit comprising a laminated capacitor according to claim 10.

18. A high-frequency circuit comprising a laminated capacitor according to claim 10.

* * * * *